United States Patent [19]

Weber

[11] Patent Number: 4,682,852

[45] Date of Patent: Jul. 28, 1987

[54] REFLECTIVE SHEETING TECHNOLOGY

[76] Inventor: Victor Weber, 2701 N. Margaret St., North St. Paul, Minn. 55109

[21] Appl. No.: 633,409

[22] Filed: Jul. 23, 1984

[51] Int. Cl.⁴ ............................................. G02B 5/12
[52] U.S. Cl. ................................... 350/105; 264/299
[58] Field of Search .................. 350/105; 264/11, 17, 264/19, 299, 319, 328.1

[56] References Cited

U.S. PATENT DOCUMENTS

| | | |
|---|---|---|
| 2,326,634 | 8/1943 | Gebhard et al. |
| 2,407,680 | 9/1946 | Palmquist et al. |
| 2,543,800 | 3/1951 | Palmquist et al. |
| 3,190,178 | 6/1965 | McKenzie ............................ 350/105 |
| 3,700,305 | 10/1972 | Bingham ............................. 350/105 |
| 3,758,193 | 9/1973 | Tung .................................... 350/105 |
| 3,795,435 | 3/1974 | Schwab. |
| 4,418,110 | 11/1983 | May et al. |
| 4,505,967 | 3/1985 | Bailey ................................. 350/105 |

Primary Examiner—John K. Corbin
Assistant Examiner—Loha Ben
Attorney, Agent, or Firm—Robert C. Baker

[57] ABSTRACT

A reflex light reflector comprising a laminate of water-insoluble layers including an internal specular-reflecting metal layer sealed between water-insoluble layers and formed in situ by vapor deposition of metal to a sufficient thickness to constitute a continuous opaque electrically conductive film, and a monolayer of microsphere lens elements of a diameter within the range of 10 to 200 microns overlying the metal layer and bonded by resinous bonding material in optical relationship thereto for reflex light reflection, wherein said metal layer is characterized by being multiply fractured in a random pattern resembling the cracking pattern of a dried mud flat such that it consists of a multiplicity of non-overlapping patches of metal, each fractionally separated from others sufficiently to render said metal layer highly resistant to electrolytic corrosion, each said patch having an area size sufficient to underlie from one up to about thirty of said lens elements, with each said patch having at least one depression therein and each said depression being optically associated with a said lens element.

12 Claims, 10 Drawing Figures

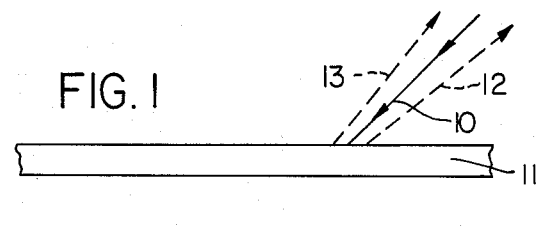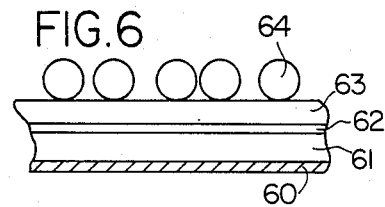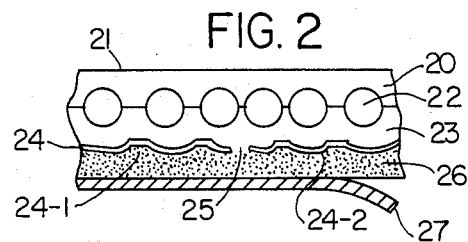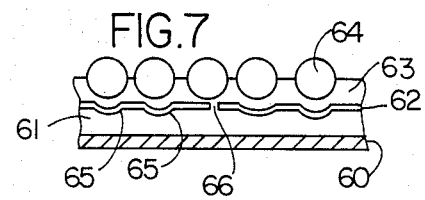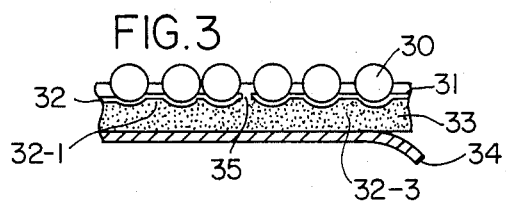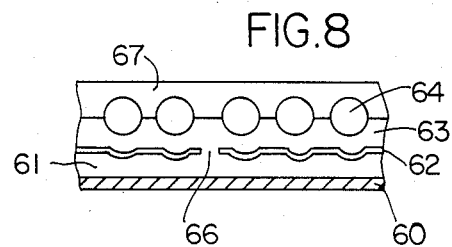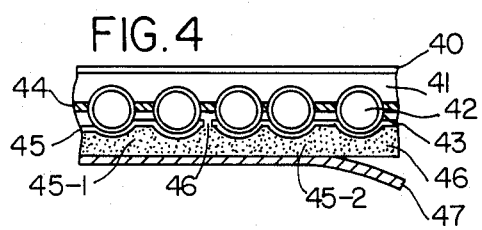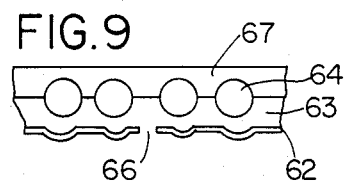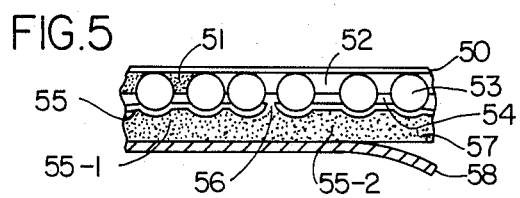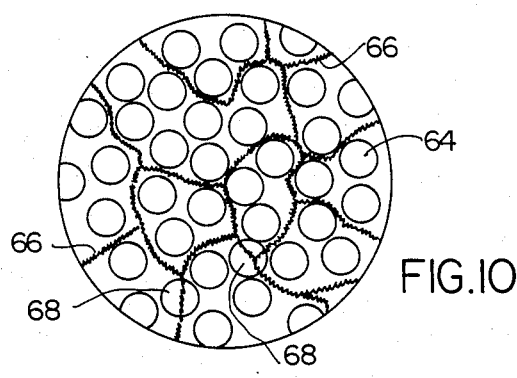

REFLECTIVE SHEETING TECHNOLOGY

BACKGROUND OF THE INVENTION

This invention relates to new and improved reflex light reflectors and new and improved methods for making a variety of different reflex light reflectors. The new reflex reflecting articles of the invention have a layer of microsphere lens elements and an underlying metal layer formed in situ by vapor deposition so as to be a continuous layer but which in fact, as it exists in the product, consists of a multiplicity of non-overlapping patches of metal, each fractionally separated from others sufficiently to render the metal layer highly resistant to electrolytic corrosion. These improved reflectors are ideally useful for highway and advertising signs and markers.

Especially significant are the new methods or processes taught herein. The procedures employed permit reliable and economical manufacture of a variety of reflex reflectors.

Specular reflecting metallic flakes such as aluminum flakes have heretofore been employed as reflectors in reflex-reflecting sheeting. The random and multiple overlapping relationship of the flakes in the sheeting necessarily introduces costly waste of material inasmuch as it is only the outer non-overlapped surface portions of the flakes that perform a useful reflective function therein.

The advantages of metal as a specular reflecting layer have long been recognized; and structures in the prior art have sometimes heretofore employed vapor-deposited metal layers (applied, however, late in the process of manufacture after bead or microsphere bonding). Vapor-deposited aluminum layers in particular have been so employed. The continuity of such vapor deposited layers has contributed to brilliance of reflex reflection, but unfortunately, that very continuity as heretofore employed (without this invention's fractional space separation at cracks) tends to render the vapor-deposited layer highly susceptible to electrolytic corrosion as the sheet material is employed in outdoor highway signs and markers.

A major benefit of the present invention is that the advantages of a continuous in situ vapor-deposited layer of metal as a specular reflector are retained, while the disadvantage of that layer being highly susceptible to electrolytic corrosion is essentially obviated.

Still other benefits and advantages of the invention will be evident as this description proceeds.

SUMMARY OF THE INVENTION

The invention provides new reflex light reflectors which comprise a laminate of water-insoluble layers including an internal specular-reflecting metal layer sealed between water-insoluble layers. This metal layer is formed by in situ vapor deposition of metal. The term "in situ" is considered appropriate inasmuch as the vapor deposition is one step in building up the product as a face up structure. Importantly, the vapor deposition of metal in these new reflectors is accomplished to a sufficient thickness to constitute a continuous electrically conductive film, that is, a film having a sufficient continuity for electrical conduction (and thus be readily susceptible to electrolytic corrosion). Such films are highly efficient opaque specular reflectors, and are to be distinguished from semi-transparent vapor deposits which are more or less discontinuous in that the deposited molecules are somewhat separated from each other and detract from high specularity of reflection (and also lack film continuity for electrical conduction).

Further, the reflectors include a compact monolayer of microsphere lens elements of a diameter within the range of about 10 to 200 microns bonded by resinous bonding material in optical relationship to the metal layer for reflex light reflection. This layer of lens elements overlies (that is, is above) the metal layer. Thus, light striking the front or face surface of the structure passes through these lens elements on its way to the specular reflecting metal layer, and then returns back through lens elements on its way toward its source.

While the metal layer is formed in situ as a continuous layer, it has special properties in the reflex light reflectors. Those properties are characterized as follows: the metal layer is multiply fractured in a random pattern of crack lines resembling the cracking pattern of a dried mud flat. Thus, the vapor-deposited metal layer, while in situ vapor deposited as a continuous layer, actually consists (in the product) of a multiplicity of non-overlapping patches of metal. Each patch is fractionally separated from others to a sufficient extent to obstruct electrical conductivity between the patches and thus render the metal layer highly resistant to electrolytic corrosion. Further, each patch has an area size sufficient to underlie at least one and no more than about thirty of the lens elements of the structure. Still further, each patch has depressions therein and each depression is optically associated with a lens element of the structure.

Reflex light reflectors of the invention may be in the form of sheeting having a flat face surface or front face of transparent resinous material overlying the lens elements. The teachings of the invention are also useful in forming reflex reflectors having a lenticular face surface, that is, a face surface formed by lens elements hemispherically exposed (i.e., exposed to air and thus having a lens-air interface).

The preferred method taught herein for making reflex light reflectors involves first preparing or forming a special laminate of layers having a releasable low-adhesion interface between a removable base structure and a product-forming structure. The base structure comprises an integrity-maintaining base web which forms one of the outer layers of the laminate, plus a deformable cushion layer of thermoplastic resinous material carried by the web. The product-forming structure comprises an in situ vapor-deposited metal layer having a sufficient thickness of vapor deposit to constitute a continuous electrically conductive film, a lens element bonding layer of thermoplastic resinous material, and a monolayer of microsphere lens elements forming the other outer layer of the laminate. The lens elements are lightly tacked in the monolayer on the surface of the bonding layer in this laminate.

The special laminate recited above is then pressure treated or compressed, preferably at an elevated temperature. The pressure applied in the compression treatment can vary but is always sufficient to press the lens elements into the bonding film up to or about at their equator level and sufficient to simultaneously form lens-element-associated depressions in the metal layer.

After the pressure treatment, the base structure and product-forming structure are stripped apart at the low adhesive interface between the same. The product-forming structure is preferably united to an adhesive layer carried on a releasable low-adhesion liner.

Still other refinements of process and product will be covered as this description proceeds.

BRIEF DESCRIPTION OF DRAWINGS

All Figures of the drawing are simplified schematic views for the purpose of giving quick visual clarity to the illustration.

FIG. 1 illustrates reflex light reflection (with divergency exaggerated);

FIG. 2 is a sectional view of a flat-top reflex-reflecting sheeting according to the invention;

FIG. 3 is a sectional view of a lenticular face surface for a reflex-reflecting sheeting of the invention;

FIG. 4 is a sectional view illustrating variance of structure for a flat-topped reflex-reflecting sheeting of the invention;

FIG. 5 is a sectional view of a flat-topped reflex-reflecting sheet structure of the invention having an underlying lenticular face surface with air-pocket-exposed lens elements underneath the flat top;

FIGS. 6 through 9, inclusive, are sectional views graphically illustrating steps of process or method for making reflex light reflectors according to the invention; and FIG. 10 is a planar face view graphically illustrating the fracture lines of cracking of the metal layer in the preferred reflex-reflectors of the invention, as the reflective face is viewed through a microscope. The lines of cracking are in fact lines of fractional separation between flake-like patches of the metal layer.

DESCRIPTION OF PREFERRED EMBODIMENTS

While reflex light reflection has become well known, the illustration of it in FIG. 1 as applicable for microsphere lens element structures will serve as a reminder. In this type of reflection, the incident beam or ray 10 striking the face surface 11 of the reflex reflector is returned or retro reflected back toward its source in a cone, illustrated by dash lines 12 and 13, having the incident beam more or less as the axis of the cone. For reflex reflectors, this is true even though the incident beam strikes the face surface of the structure at varying angles from normal or from perpendicular to the face surface. Note that the cone of returned light becomes broader or expands as the light is returned or reflex reflected. This feature is called divergence. It is a beneficial feature. (If the incident headlight rays of an automobile were retro-reflected or reflex-reflected perfectly back toward the headlight source, with no divergence, reflex-reflecting signs and markers along a highway would not appear to be "lighted" and attention-getting to the vehicle occupants, whether at close or at long range.)

However, the very benefit of divergence also tends to reduce the intensity of the light returned to the eyes of a viewer as compared to the intensity of the ray striking the face of the reflex reflector. This constitutes one reason for employing the most efficient of specular-reflecting means in these structures. Vapor-deposited metal specular reflectors are considered to be highly efficient for return of light focused on them by the microsphere lens elements; and amongst the best of these is vapor-deposited aluminum, although substantially equivalent results may be obtained with other vapor-deposited metals and sometimes the color benefits of using different metal vapor deposits will dictate their choice over aluminum. Aluminum presents a silvery light return, although this may be adjusted by employing transparent colored resinous coatings in the structure.

(The term "specular" as employed in conjunction with reflection is commonly understood to refer to that type of reflection characteristic of an ordinary mirror, where, as is well known, an incident light beam striking the mirror at an angle of about 5° one way from normal will leave the mirror at an approximately opposite and equal angle.)

It is within the ambit of this invention to form microsphere-type reflex reflectors of a variety of types. The optical relationships between microsphere lens elements and underlying specular reflecting means for reflex reflection has been the subject of work by others. This invention, however, provides an extraordinarily economical means, and a highly reliable means, for gaining the desired optical relationships according to the will of operators, with little or no worthless final product, which has been a problem where ability to test the optical relationships as they are formed in manufacture is handicapped by the nature of the methods employed. Most importantly, the new methodology taught herein imparts unique characteristics to the vapor-deposited metal layer, with retention of its high specularity and yet an astonishing alteration of its otherwise disadvantageous characteristics.

Referring to FIG. 2, the reflex-reflecting sheeting there illustrated is characterized as having a flat top, and in this respect is comparable to reflex light reflectors described in Palmquist et al U.S. Pat. No. 2,407,680, issued Sept. 17, 1946, here incorporated by reference. As compared to lenticular surfaced reflex reflectors, the occurrence of rain or wetting on the surface of a flat-topped structure presents little interference with the ability of the structure to reflex reflect incident light. The layers of the flat-topped structure illustrated in FIG. 2 are: a transparent resinous covering 20 with a flat front face 21, a compact monolayer of microsphere lens elements 22, a transparent lens-element binder and spacing layer or film 23, a vapor-deposited metal film 24 having the characteristics for the metal layer as described herein, and particularly having lines of rupture as illustrated at 25 between patch 24-1 and another patch 24-2. Interestingly, the depressions in the metal layer assume somewhat of an inverted pyramid character in these structures having a spacing layer between the microspheres and the depressions of the metal layer. The inverted pyramid analogy should be understood to be a reference to angular orientation of a multiplicity of contiguous minute planes formed by minute folds and giving an approximately overall cup-like shape to the depressions in the metal layer. Behind the metal layer 24 is an adhesive layer 26 having a removable temporary liner 27 (shown partially removed). The liner is removed at the time cut portions of the sheeting are adhesively affixed to a sign or marker.

In FIG. 3, the reflex reflector illustrated has a lenticular surface formed by hemisphere projections of the microsphere lens elements 30 out of their bonding film or layer 31. In this lenticular respect, the structure of FIG. 3 bears analogy to lenticular surfaced reflex reflectors of Gebhard et al U.S. Pat. No. 2,326,634, issued Aug. 10, 1943, here incorporated by reference. Underlying the compact monolayer of microsphere lens elements 30 is an in situ vapor-deposited metal layer 32 having the special characteristics taught herein and particularly the line of rupture 35 separating patch 32-1 from patch 32-3. The microspheres are suitably and preferably in direct contact with the metal layer and lie in depressions in it, with the metal cupped more or less hemi-spherically about the back surface of the microsphere lens elements. Thus, the metal layer depressions in these structures are in substantial concave contact about the back surface of the lens elements. Underlying the metal layer 32 is an adhesive layer 33 and a removable temporary liner 34.

FIG. 4 illustrates a flat-topped reflex reflector having a transparent surface film 40 which may be formed of colored resinous material or formed by adhering a film of polyester material such as "Mylar" (polyethylene terephthalate) over a transparent resinous covering layer 41. This structure illustrates tiny glass beads or microspheres 42 discretely coated with a spherical covering of transparent resinous material 43 which suitably may serve as the equivalent of the transparent spacing film 23 in FIG. 2. Further, to provide a specially colored appearance for daytime viewing, interstitial spaces between the spherically covered lens elements may be filled with a pigmented resinous layer of material 44. Underlying the spherically covered lens elements is the vapor-deposited metal layer 45 having the characteristics of the invention and including the ruptured or fractured characteristic 46 between patches 45-1 and 45-2, as well as a substantially concave contact about the space coating 43 of the individual microspheres. Underlying the metal film 45 is an adhesive layer 48 and a temporary removable liner 47. This structure is offered merely to illustrate variable details which may be built into microsphere-type reflex reflectors having new features of the invention. Of course, a reflex reflective sheeting incorporating a transparent colored film 40 may omit the pigmented material layer 44, if desired, and vice versa. The important point is that a multitude of possibilities exists for imparting a variety of colored effects as those skilled in the art will readily appreciate.

In the structure of FIG. 5, the principle is illustrated that a lenticular surfaced reflex reflector may be provided with air cells defined by a grid pattern which secures a flat top film 50 over the lenticular surface. For such details, reference is made to the general concepts for air cell structures as illustrated in McKenzie U.S. Pat. No. 3,190,178, issued June 22, 1965, here incorporated by reference. Illustratively, a biaxially oriented polyester film of transparent nature may be employed, or a film of biaxially oriented methyl methacrylate. The film 50 is adhered or fixed to the underlying lenticular surfaced reflex reflector along grid lines formed by any suitable bond or adhesive material 51. The lines 51 of adherence are in a grid pattern so as to form a multiplicity of cellular spaces 52 occupied by a multitude of hemispherically exposed lens elements 53 held in bonding film 54. The exposed hemispherical upper part of the lens elements 53 is within air cells of the structure, thus presenting a lens-air interface for the optical conditions for high brilliance lenticular reflex reflection, as those skilled in the art now readily appreciate. Underlying the lens elements 53 is an in situ vapor-deposited metal layer 55 having the special characteristics for that layer as described above, particularly in connection with FIG. 2. Again, a line of rupture 56 is illustrated between patch 55-1 and patch 55-2. An adhesive layer 57 with a temporary liner 58 completes the structure.

It should be emphasized, if not already evident, that the variations of structure illustrated, except for the special characteristics of the in situ vapor-deposited metal layer in the combination, are at this point in time well known to those skilled in the art. Thus but modest characterization of suitable materials to employ should suffice. Adhesive layers may be formed of either heat-tackifying or permanently pressure-sensitive adhesives, with of course a caution that the heat-tackified layers should not require so much heat for tackification as to destroy optical relationships in the remaining portion of the structure. Commonly, plasticizers are mixed with resinous materials to lower the temperature for heat tackification. Pressure-sensitive adhesives of any well-known type (commonly referred to as rubber-resin type and equivalents, especially acrylate pressure-sensitive adhesives) may be employed so long as they do not attack either during manufacture or in use the characteristics of the vapor-deposited metal layer as a specular reflector (or are prevented from so attacking by interposing a thin film of protective resin between the adhesive layer and the metal layer). Removable liners commonly are formed in an economical manner by coating paper with a layer or film of polyethylene or silicone. Such coatings are widely known as films from which conventional popular adhesive films or layers are readily released without significant transfer of adhesive to the coated liner. A suitable bead or microsphere bonding coat or layer may be formed by using polyvinylbutyral resin, particularly the vinylbutyral resin characterized as XYHL available from the chemicals and plastics division of Union Carbide Corporation having an address at 270 Park Avenue, New York, N.Y. 10017. Other bead bonding layers of course are useful, such as acrylic base polymer resins. These resins or others may be employed also as the space coatings for flat-topped reflex reflectors, according to principles set forth in the aforementioned Palmquist et al patent. As the top coating for the flat-topped reflectors, it is preferable to choose a different transparent resin and preferably one which can be applied in a manner not solvating or otherwise disturbing the optical relationships between the lens elements and the specular-reflecting film of a flat-topped structure. For that reason, I preferably employ as the top coat transparent resin layer a polyurethane such as for example one formed by curing the urethane coating composition available from Wyndham Chemical Company, 10640 South Painten Street, Santa Fe, Calif. 90670, under the designation WC2176. Application of this material is possible without the addition of any solvent, for it is liquid in character and is readily cured or polymerized on mild heating to about 120° C. to form a water insoluble film. Indeed, the materials present in all portions of the product are insoluble in water. Especially important is the fact that the layers on each side of the specular film must be insoluble in water.

Useful microsphere lens elements for the structures have a diameter within the range of about 10 to 200 microns. Preferably, however, the diameter range selected for any one structure should be more limited, and most preferably, transparent glass beads or microsphere lens elements are segregated from a raw batch of the same by passing the batch through sieve sizes of varying mesh so as to collect those of the larger size and pass those of the smaller and end up with preferred useful batches where the largest size is not over about twice the diameter of the smallest size, and even preferably not over about 50% the diameter of the smallest size. Overall, however, it may be stated as a general proposition that the preferred range of sizes for the microsphere lens elements will lie between about 25 microns up to about 100 or possibly 125 microns. Again it is emphasized that the most preferred size range for any one stretch of sheeting should be limited to a range where the largest diameters are not in excess of about 50% the smallest diameters, and even most ideally not over about 25% greater than those of smallest diameter.

Referring now to FIGS. 6 through 9 inclusive, a method will be described for manufacture of the reflectors in a manner effectively creating unique characteristics for the vapor-deposited film.

The first step of manufacture involves a series of substeps in forming a laminate of layers built up on an integrity-maintaining base web 60. By integrity-maintaining is meant a web or sheet which does not disintegrate or fall apart under the conditions of processing. A suitable web is paper, preferably a calendered hard surface paper such as 50–80 pound Fourdrinier or equivalent.

On the base web 60 is coated, as by roll coating, a pressure-deformable cushion layer 61 of thermoplastic resinous material. Illustratively, polystyrene is suitable to employ, as also is a co-polymer of vinylchloride and vinylacetate such as the co-polymer VYHH of Union Carbide Corporation. The resin is suitably roll-coated from a solvent mixture; and toluene as well as methyisobutylketone have been employed. Resin solid content in the solvent for the roll-coating step can vary, but approximately 30 to 50% resinous solids by weight is preferred. The dried thickness of the coating after solvent removal should be in the range of at least 1 mil, preferably at least a couple mils and need not be in excess of about 2½ mils, although it may be as thick as 3 mils, or more (as where microspheres of the larger sizes within the range of diameter aforenoted are employed). The coating of this cushion layer should be accomplished in a manner so as to present, on drying of it, a very smooth outer or upper surface. Further, the upper surface of this cushion layer must release readily from the next applied layer of the laminate, for the base web and cushion layer constitute a removable base structure portion of the composite laminate formed at this stage.

Thus, the resin selected for the cushion layer will normally be one to which a vapor deposit of metal will exhibit poor adherence or low adhesion and therefore will readily release for removal from the cushion layer. On the other hand, if cushion layers to which vapor deposited metal is adherent are used, a suitable expedient to create a releasable low-adhesion interface between the base structure of layers 60 and 61 and the next layer of the laminate is that of employing a strippable film coating on the cushion layer (i.e., a film coating exhibiting poor adhesion to the cushion layer). Such a strippable film should be exceedingly thin, not over about a mil or 25 microns in thickness and preferably much less, for it suitably may become but a thin film portion of the final reflective product. If desired, reflective pigments or flakes may be included in this strippable film, although their function as a reflector in the final product would be limited to the minute areas of fractional separation between patches of the metal layer. The fundamental principle to observe for this laminate is that of creating a low-adhesion interface between the contact layer of the base structure (which is later removed from the laminate) and the adjacent layer of the product-forming portion of the laminate.

Most preferably, the resin selected for the cushion layer 61, particularly when reflecting articles such as illustrated in FIG. 1 are to be formed, is from amongst those which, when heat or elevated temperature is employed for the later embossing or compression pressure step, will exhibit a slightly greater flow or plasticity than the resin selected for the spacing layer. Illustratively, temperatures of approximately 180° C. (360° F.) have been found to be near ideal for the pressure compression step. A cushion layer formed as described functions well with other elements of structure, under the pressure treatment to be described, to effect the breaking up or fracturing of the aluminum layer, as well as to effect fractional separation of patches of it, without destroying its specularity performance.

Remaining layers which form the laminate are product-forming layers. Normally, the next layer will be that formed by vapor depositing metal directly on the cushion layer. Vacuum deposition techniques as heretofore known may be employed. The important consideration is that of applying a sufficient thickness of vapor deposit, preferably aluminum, so as to create a continuous vapor deposited film or layer 62. This is to be distinguished from vapor deposits which are semi-transparent and essentially have but discrete particles or molecules of aluminum which may give a visual appearance of being continuous but in fact lack density in that they permit the transmission of light through the film. The vapor deposit of this invention is such that it is opaque and continuous and effectively constitutes an electrical conductor, although not the most excellent of conductors. Conductivity is achieved as soon as a continuous dense opaque deposit is formed, that is, one blocking light transmission. Thicker vapor deposits may be employed, if desired, but are generally unnecessary after opaqueness is reached. Such a layer presents a highly specular reflecting surface. It also appears to be a layer exhibiting more brittleness than metal foils, which by comparison are more ductile.

After the vapor deposit step, two major options present themselves. One is that of specially coating a space coat over the metal layer and then applying a lens element or bead bonding film over the space coating. The other is that of applying a film 63 of resinous material characterized as the lens element bonding film and either applying it at a thickness for it to function as both a bead bonding layer as well as a spacing layer for a flat-topped structure, or applying it as a thinner layer and simply employing it for the purpose of hemispherically bonding the lens elements without a special spacing relationship to the metal layer 62. In either event, a lens element bonding film is applied. It of course may be applied in two steps. One may constitute or in essence form the spacing layer where a flat-topped sheet structure is to be manufactured; and the other or later applied layer may be looked upon as functioning as the lens element bonding layer per se.

Ideally, the lens element bonding film 63 is applied as a single step, whether sufficiently thick for spacing purposes as well as lens element bonding, or so thin as to simply serve per se as a lens element bonding layer. A preferred resin for film 63 is polyvinylbutyral resin (e.g., resin XYHL of Union Carbide Corporation). Approximately a 20% solids solution of this resin in ethyl alcohol or any other suitable diluent or solvent (e.g., including mixtures such as a 50—50 mixture of an alcohol and a glycol ether mixture) is satisfactory for roll coating purposes; and roll coating is suitably employed, followed by drying. In selecting the lens element bonding resin, the important consideration is that it must adhere well to the glass microsphere lens elements and in addition exhibit sufficient deformability or plasticity at the later pressure compression treatment to receive the lens elements up to about their equator into it. But the deformability or plasticity of this bonding film 63, when a spacing function for it is also to be gained (as where the article of FIG. 1 is to be made) must be less than the deformability or plasticity of the cushion layer 61 under the conditions of later processing, that is, under the conditions experienced by each in the processing under the compression pressure step. But where microspheres are to be placed contiguously against the vapor-deposited film, the plasticity of the cushion layer may vary, or even be less than that of the lens element bonding film under the conditions employed in the pressure compression step. Preferably, even when the microspheres are placed contiguously against the vapor-deposited film, the lens element bonding layer will deform (i.e., have less plasticity) less readily than the cushion layer.

Then the next step of the laminate formation is that of applying a monolayer of microsphere lens elements 64 on the exposed surface of the bonding film 63. Suitably, this is accomplished by passing the entire laminate of layers 60, 61, 62, and 63 over a heated cylinder (with the web 60 next to the cylinder) to elevate the temperature of film 63 up to about 180° C. so as to tackify it. Simultaneously, the glass beads in the nature of microsphere lens elements are sprayed or dropped from a hopper onto the tacky surface of the layer 63, with excess beads falling away (as by inverting the laminate) to leave essentially a monolayer in rather compact form adhering to it.

Thereafter, this laminate (as illustrated graphically in FIG. 6) is promptly passed through the nip of squeeze rollers or between squeeze rollers adjusted to pressure such that the microspheres 64 are pressed up to about their equator into the film 63; and this is preferably done while maintaining elevated temperature conditions, suitably with film 63 at about 180° C. The heat from employing a heated drum as one of the squeeze rollers is suitable for this purpose; and in this respect it should be recognized that a small differential or drop in temperature may exist from the web to the bead bond layer 63. Pressure adjustments are necessary at this stage to accomplish the optical relationships between the lens elements and specular vapor deposited layer, as those relationships are well known in the art for microsphere reflex reflectors. Such relationships are described, for example, in the aforenoted Palmquist et al Patent for a flat-topped structure (where spacing between the layer of microspheres and the specular reflecting layer is employed), and in the aforenoted Gebhard et al Patent for a lenticular surfaced structure (where the microspheres and reflector layer are continuous or contacting). Checking the proper optical relationships between the microspheres and the specular metal layer is easily accomplished since the structure exiting from the pressure treatment may be subjected to examination for its reflex reflectivity and, if necessary, the pressure treatment then adjusted according to the will of the operator.

It is this step of pressure treatment, as just discussed, that effects a substantial alteration of the vapor-deposited metal layer 62; and the results of this alteration are illustrated graphically in FIG. 7 and also FIG. 10. One thing that happens is that the metal layer 62 is converted from a purely flat layer into one having varying depressions 65 therein, with each depression optically associated with and underlying a lens element 64. This result appears to be enhanced by employing a bead bonding or microsphere lens bonding layer 63, whether thick or thin, having a greater bodying strength or resistance to flow under the temperature conditions of processing than the layer 61 serving as the cushion layer. Another phenomenon that takes place is that the metal layer is multiply fractured or ruptured, as at the crack 66 illustrated in FIG. 7 and crack lines 66 of FIG. 10. The thickness of vapor deposit, however, is such that the fracture lines or cracking pattern is not so frequent as to form a discrete platelet of metal under each lens element. The multiple fracturing of the metal layer is in a random pattern of lines resembling the cracking pattern of a dried mud flat. It consists of a multiplicity of non-overlapping depression-containing flake-like or plate-like patches of metal. But each patch has an area size sufficient to underlie at least one and no more than about thirty of the lens elements. Further, and most important, each of the lines 66 illustrated in FIG. 10 represents a minute space. Each patch of metal is fractionally separated from the others sufficiently to obstruct electrical conductivity between the patches, thus rendering the metal layer highly resistant to electrolytic corrosion. Additionally, however, the metal layer retains its high specularity of reflection and functions as a specular reflector of light striking it (as focused on it by the lens elements 64).

Thus, the metal layer is fundamentally altered in the pressure treatment of the special laminate. Magnified examination reveals that the crack lines indeed do sometimes occur under the lens elements themselves. What is interesting, however, is that the fractional separation of the patches at the crack lines is so microscopic as to be but a few microns in width, and a width less than the diameter of lens elements at locations optically overlying adjacent patches of the metal layer at the crack line therebetween. This principle is illustrated in FIG. 10, where lens elements 68 overlie a crack line and optically overlie metal of adjacent patches of metal. Not over 15% (and usually not over 10%) of the total number of lens elements in a monolayer over any significant area of the sheeting (i.e., an area of a couple square centimeters or more) are in locations of the crack lines, a fact which in retrospect is surprising. Generally, one expects fracturing at points of pressure (i.e., at the tangent contact between a "pole" of a bead and metal layer), but the conditions of processing the special laminate promotes the formation of crack or fracture lines between the bead (that is, microsphere) locations.

Still further, in the most preferred structures, most of the discrete patches of the metal layer are of an area size that underlies at least two and no more than twenty microsphere lens elements, or even no more than fifteen lens elements. Stated another way, 80% of the lens elements in the preferred structures are within the area boundary or edge of individual patches of metal having at least two and no more than 20 (or no more than 15) lens elements per discrete patch. They are optically entirely within the perimeter edges (area boundary) of such patches. In general, preferred structures of this type have greater depths for depressions optically associated with the microspheres; and they generally exhibit improved angularity of reflex reflection over those having larger areas for the patches. By improved angularity is meant an improved reflex reflective light return for incident light striking the structure at increasing angles from a normal or perpendicular incidence.

The size of the patches of metal varies randomly, but few exceed 1000 microns in their largest dimension. For preferred structures, the longest dimension of patches generally does not exceed 750 microns and most are less, e.g. not over 500 microns.

After the pressure treatment with results as illustrated in FIG. 7, and assuming for the moment that a flat-topped reflex reflector is to be formed, the next step is that of applying (see FIG. 8) the flat top coating 67; and procedures and materials such as illustrated in the forenoted Palmquist et al. U.S. Pat. No. 2,407,680 may be employed. Ideally, however, transparent polyurethane resins are employed as the top coating resin, as previously noted. They are applied, as by roll coating, from a liquid state containing no solvent and are cured in situ by heating. Preferably the curing temperature for the resin selected should be below that employed for the pressure embossing step. The reason for this is to avoid triggering any possible memory reversion of the resin layers, and thus the shaped and fractured metal film, back toward a flat condition.

The layers 60 and 61 perform no further useful function in the article after the pressure treatment and for that reason are removed, as by stripping, so as to reduce the thickness of the final article. Thereafter, an adhesive layer carried by a removable liner is laminated to the structure of FIG. 9 so as to form a structure as illustrated in FIG. 2.

Of course, in the event a lenticular surfaced structure is to be formed, the step of applying the coating 67 to achieve a flat top will be omitted and the lens elements normally pressed into depressed direct contact with the metal layer, as illustrated in FIG. 3.

The specular reflecting metal layer is sealed between water insoluble layers. This is most important inasmuch as it is the constant weathering to which sheet material on signs and markers is subjected in use that has heretofore constituted a problem with respect to corrosive deterioration of any continuous specular reflecting metal film, although the continuous types are the most efficient. Testing of that corrosion characteristic can be accomplished by immersing a sheet sample in a water solution of about 5% by weight of a metal salt (e.g., copper sulfate) and then cutting the sheeting or scratching it through the vapor coat. It is in this test that the metal layer of the structures of this invention shows exceedingly high resistance to electrolytic corrosion. When tested against otherwise comparable sheetings but sheetings which have a continuous specular reflecting metal layer, the sheetings of this invention show insignificant evidence of corrosion eating in from the cut edges whereas the sheetings containing continuous metal layers evidence corrosive degradation of substantial distance or width from the cut edges, with consequent loss of the reflex light reflection capability as well as development of a poor visual appearance.

Because the optical relationship between microsphere lens elements and specular reflecting metal layers may vary depending on the different qualities and types of reflex-reflecting sheeting to be manufactured, as is well known and well understood and documented in a multitude of earlier patents on reflex-reflecting sheeting formed of small glass beads or microsphere lens elements, those skilled in the art will readily recognize that the principles of this invention may be employed in a wide variety of reflex reflectors according to varied optical relationships that are now well known. In general, resinous materials exhibit a refractive index (nD) around 1.5, with some resins exhibiting refractive indices even lower. Useful lens elements should exhibit refractive indices of at least 1.65 and generally above 1.7. Lenticular surfaced structures having their lens elements in pressed contact relationship against the specular reflecting metal layer preferably employ lens elements exhibiting refractive indices from approximately 1.7 up to approximately 1.9, although microspheres of somewhat lower (down to about 1.65) or higher (up to about 1.95) refractive indices may be employed for such structures. As microspheres of higher and higher refractive indices (up to 2.8 or even possibly 2.9) are employed in flat-topped structures, the spacing requirement of the microspheres from the specular reflecting metal layer diminishes, and even becomes unnecessary, as is now well known. (See principles discussed in the aforenoted Palmquist et al U.S. Pat. No. 2,407,680). The prior art contains a multitude of teachings dealings with microsphere lens elements having refractive indices well over 2.0. These references to the prior art are intended to emphasize that the teachings of this invention may be incorporated in a variety of reflex light reflectors using conventional and now well known optical relationships.

Accordingly, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing descriptions; and all changes which come within the meaning and range of equivalency of the claims as construed for validity are therefore intended to be embraced thereby.

That which is claimed is:

1. A reflex light reflector comprising a laminate of water-insoluble layers including an internal specular-reflecting metal layer sealed between water-insoluble layers and formed in situ by vapor deposition of metal to a sufficient thickness to constitute a continuous opaque electrically conductive film, and a monolayer of microsphere lens elements of a diameter within the range of 10 to 200 microns overlying the metal layer and bonded by resinous bonding material in optical relationship thereto for reflex light reflection, wherein
said metal layer is characterized by being multiply fractured in a random pattern of crack lines resembling the cracking pattern of a dried mud flat such that it consists of a multiplicity of non-overlapping patches of metal with adjacent patches having a crack line therebetween, each fractionally separated from others sufficiently to obstruct electrical conductivity between patches and thereby render said metal layer highly resistant to electrolytic corrosion, said crack lines of said metal layer being not so frequent as to form a discrete patch of metal under each said lens element, said patches of metal being of varied area size with each patch having an area size sufficient to underlie at least one up to about thirty of said lens elements, each said patch not exceeding 1000 microns in its longest dimension, with each said patch having at least one depression therein and each said depression being optically associated with a said lens element in a manner such that each lens element overlies a said depression, said laminate being further characterized by having over 80% of said lens elements thereof overlying patches having at least two and no more than twenty said lens elements optically entirely within the perimeter edges of individual said patches of metal.

2. The reflector of claim 1 wherein not over 15% of said lens elements are at locations optically overlying adjacent patches of said metal layer at the crack line therebetween.

3. The reflector of claim 1 wherein said lens elements have a refractive index of at least 1.65.

4. The reflector of claim 1 wherein the diameter of said lens elements lies within the range of 25 to 100 microns.

5. The reflector of claim 1 having a flat face surface formed by transparent resinous material overlying said lens elements.

6. The reflector of claim 1 having a lenticular face surface, with said lens elements hemispherically exposed to air.

7. The reflector of claim 1 wherein said lens elements are spaced from said depressions in said metal layer by a transparent resinous material interposed therebetween.

8. The reflector of claim 1 wherein said lens elements lie in said depressions of said metal layer with the metal of said depressions in substantial concave contact with the back surface of said lens elements.

9. A method for making a reflex light reflector having outer layers, comprising forming a laminate of layers including said outer layers, said laminate having a releasable low-adhesion interface between a removable base structure and a product-forming structure, said base structure comprising an integrity-maintaining base web which forms one of the outer layers of said laminate and a deformable cushion layer of thermoplastic resinous material carried by said web, said product-forming structure comprising an in situ vapor-deposited flat metal layer having a sufficient thickness of vapor deposit to constitute a continuous opaque electrically conductive film, a lens element bonding layer of thermoplastic resinous material, and a monolayer of microsphere lens elements forming the other outer layer of said laminate, said lens elements being lightly tacked on the surface of said bonding layer, pressure treating said laminate by passing it through the nip of squeeze rollers under elevated temperature conditions, said pressure treatment under elevated temperature conditions being effective to press said lens elements into said bonding layer up to at least about their equator level while simultaneously effectively causing lens-element depressions in said metal layer and multiple fracturing of said metal layer into a random pattern of crack lines resembling the cracking pattern of a dried mud flat, whereby said metal layer is converted to one highly resistant to electrolytic corrosion and consisting of a multiplicity of non-overlapping separated patches of metal wherein each patch has at least one depression, with each such depression underlying a said lens element and optically associated therewith, stripping said base structure and said product-forming structure apart at said low-adhesion interface between the same, and laminating to said product-forming structure on the surface thereof opposite said lens elements an adhesive layer carried on a releasable low-adhesion liner.

10. The method of claim 9 wherein said pressure treatment under elevated temperature conditions is sufficient to press said lens elements directly onto said metal layer and to cause said metal layer depressions to be in substantial concave contact about the back surface of said lens elements, and wherein said patches have an area size sufficient to underlie at least one up to about thirty of said lens elements, and wherein at least 80% of said lens elements overlie patches having at least two and no more than twenty said lens elements optically entirely within the perimeter edges of individual said patches.

11. The method of claim 9 wherein the material of said cushion layer is more readily deformable than the material of said lens element bonding layer at elevated temperatures, wherein said pressure treatment under elevated temperature conditions is accomplished while simultaneously maintaining said laminate at a said elevated temperature sufficient to effect greater thermoplasticity for said cushion layer than said lens element bonding layer, and wherein said patches have an area size sufficient to underlie at least one up to about thirty of said lens elements, and wherein at least 80% of said lens elements overlie patches having at least two and no more than twenty said lens elements optically entirely within the perimeter edges of individual said patches.

12. The method of claim 9 further comprising applying, over said lens elements, a flat top coating of a transparent curable resin with a curing temperature below that used for said pressure treatment.

* * * * *